(12) United States Patent
Watanabe et al.

(10) Patent No.: US 11,069,909 B2
(45) Date of Patent: Jul. 20, 2021

(54) FUEL CELL VEHICLE AND METHOD FOR CONTROLLING THE SAME

(71) Applicant: TOYOTA JIDOSHA KABUSHIKI KAISHA, Toyota (JP)

(72) Inventors: Takao Watanabe, Nagakute (JP); Tomoya Ogawa, Okazaki (JP); Tatsuya Fukami, Toyota (JP); Junichi Matsuo, Okazaki (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 180 days.

(21) Appl. No.: 16/585,095

(22) Filed: Sep. 27, 2019

(65) Prior Publication Data

US 2020/0127310 A1 Apr. 23, 2020

(30) Foreign Application Priority Data

Oct. 17, 2018 (JP) .............................. JP2018-195818

(51) Int. Cl.
*H01M 8/04303* (2016.01)
*H01M 8/0432* (2016.01)
*B60L 50/75* (2019.01)
*H01M 8/04228* (2016.01)
H01M 8/04302 (2016.01)
H01M 8/04225 (2016.01)

(52) U.S. Cl.
CPC ......... *H01M 8/04303* (2016.02); *B60L 50/75* (2019.02); *H01M 8/04228* (2016.02); *H01M 8/04373* (2013.01); H01M 8/04225 (2016.02); H01M 8/04302 (2016.02)

(58) Field of Classification Search
CPC ......... H01M 8/04228; H01M 8/04303; H01M 8/04373; B60L 50/75
USPC .......................................................... 429/428
See application file for complete search history.

(56) References Cited

U.S. PATENT DOCUMENTS

| | | | |
|---|---|---|---|
| 2017/0036514 A1* | 2/2017 | Umehara | B60H 1/00385 |
| 2017/0166081 A1* | 6/2017 | Kwon | B60L 58/32 |
| 2017/0210240 A1* | 7/2017 | Unno | B60L 11/1859 |
| 2017/0237092 A1* | 8/2017 | Ogawa | H01M 8/04373 |
| | | | 429/9 |
| 2018/0026280 A1* | 1/2018 | Hasegawa | H01M 8/04634 |
| | | | 429/432 |

FOREIGN PATENT DOCUMENTS

| | | | | |
|---|---|---|---|---|
| JP | 2017168369 A | 9/2017 | | |
| KR | 100645560 B1 * | 11/2006 | | B60L 15/20 |

* cited by examiner

*Primary Examiner* — James M Erwin
(74) *Attorney, Agent, or Firm* — Dickinson Wright, PLLC

(57) ABSTRACT

In a fuel cell vehicle, when temperature of a power storage device detected by a temperature sensor is a second temperature, which is lower than a predetermined first temperature, at least in a period when the power storage device is allowed to be charged with regenerative electric power, remaining charge is controlled by setting a lower limit to a value higher than a lower limit set at the first temperature. When a stop instruction for a fuel cell system is input, remaining charge raising processing for raising the remaining charge of the power storage device is performed.

6 Claims, 7 Drawing Sheets

FUEL CELL VEHICLE AND METHOD FOR CONTROLLING THE SAME

CROSS REFERENCE TO RELATED APPLICATIONS

The present application claims priority to Japanese Patent Application No. 2018-195818, filed on Oct. 17, 2018, the contents of which are incorporated herein by reference in their entirety.

BACKGROUND

Field

The present disclosure relates to a fuel cell vehicle and a method for controlling the fuel cell vehicle.

Related Art

When the fuel cell vehicle is started, various processing is generally performed to start power generation by a fuel cell. For example, Patent Literature 1 describes a configuration in which, when the fuel cell vehicle is started under a low temperature condition, supply of gas is started while gas flow paths are controlled by valves at several places in a fuel cell system, so that the power generation is started by the fuel cell while freezing is suppressed.
Patent Literature 1: JP 2017-168369A However, when some sort of processing is performed in the fuel cell vehicle before the fuel cell starts generating electric power, the fuel cell vehicle can use neither the electric power generated by the fuel cell nor regenerative electric power generated by traveling of the vehicle. Therefore, it is necessary to use the electric power supplied from a secondary battery to perform the processing before the fuel cell starts generating the electric power. Accordingly, there is a demand for enhancing supply efficiency of the electric power used to charge the secondary battery so as to improve fuel efficiency of the fuel cell vehicle.

SUMMARY

According to one aspect of the present disclosure, a fuel cell vehicle is provided. The fuel cell vehicle comprises a fuel cell system including a fuel cell and fuel cell auxiliary machinery, a drive motor configured to drive the fuel cell vehicle, a power storage device configured to be charged with electric power generated by the fuel cell and regenerative electric power generated by the drive motor and to store electric power to supply to the drive motor, a remaining charge monitor configured to detect remaining charge in the power storage device, a temperature sensor configured to detect temperature of the power storage device, and a power controller configured to control an operation state of the fuel cell system while controlling the remaining charge of the power storage device to be equal to or higher than a predetermined lower limit. When the temperature of the power storage device detected by the temperature sensor is a second temperature, which is lower than a predetermined first temperature, at least in a period when the power storage device is allowed to be charged with the regenerative electric power, the power controller controls the remaining charge by setting the lower limit to a value higher than the lower limit set at the first temperature. When a stop instruction for the fuel cell system is input, the power controller performs a remaining charge raising processing for raising the remaining charge of the power storage device.

DETAILED DESCRIPTION

Figure 1:
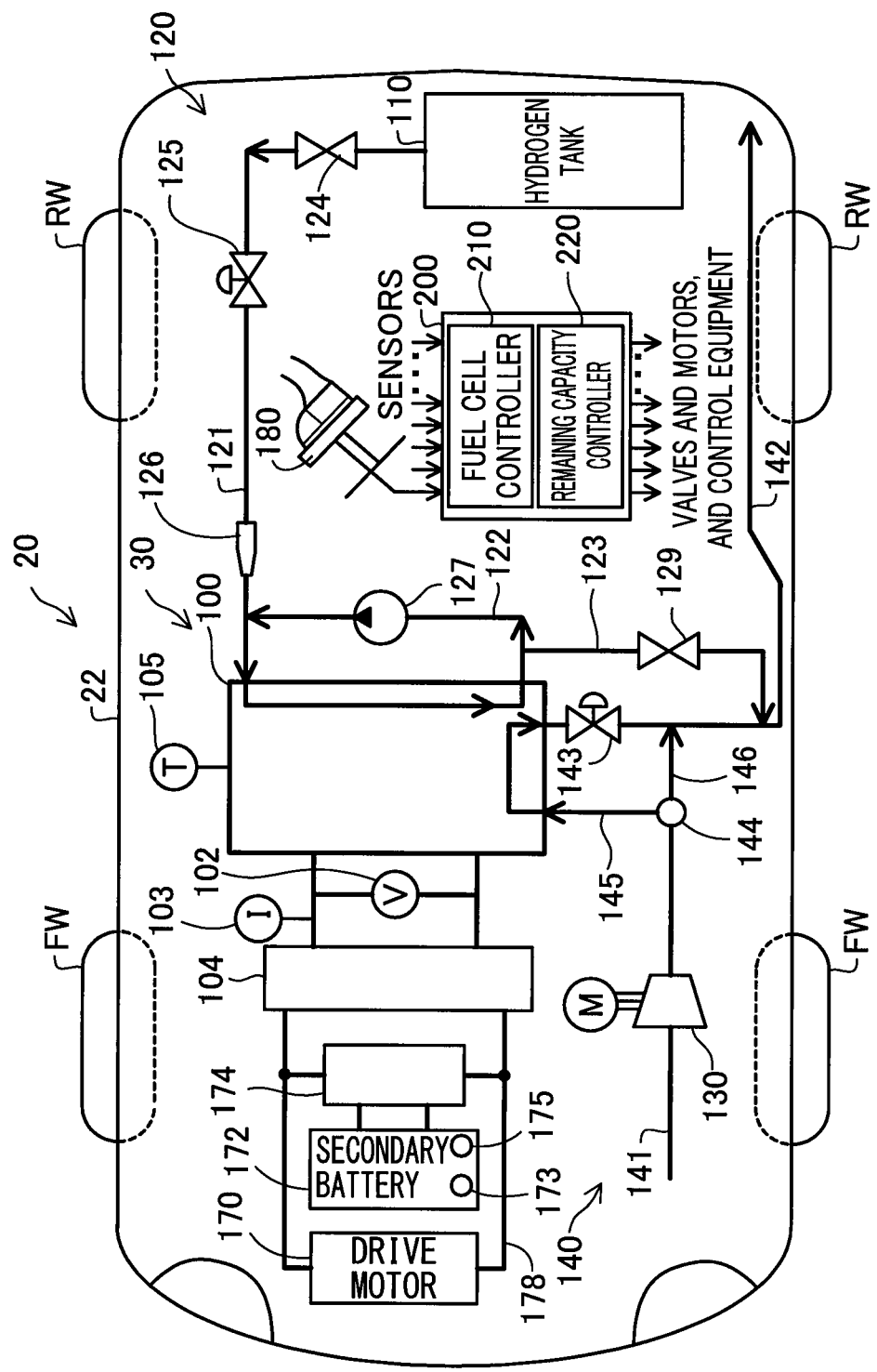
FIG. 1 is an explanatory diagram illustrating a schematic configuration of a fuel cell vehicle.

A. First Embodiment (A-1) Overall Configuration of Fuel Cell Vehicle:
FIG. 1 is a block diagram illustrating a schematic configuration of a fuel cell vehicle 20 according to a first embodiment of the present disclosure. The fuel cell vehicle 20 comprises a drive motor 170 configured to generate driving force of the vehicle, a fuel cell system 30 including a fuel cell 100, a secondary battery 172 configured to supply electric power for driving the fuel cell vehicle 20, and a controller 200, in a vehicle body 22. In the fuel cell vehicle 20, the electric power can be supplied to loads including the drive motor 170 from the fuel cell 100 and the secondary battery 172 independently or simultaneously. The fuel cell 100 and the loads including the drive motor 170 are connected via a DC-DC converter 104 and wiring 178 while the secondary battery 172 and the loads including the drive motor 170 are connected via a DC-DC converter 174 and wiring 178. The DC-DC converter 104 and the DC-DC converter 174 are connected to the wiring 178 in parallel.

In addition to the fuel cell 100, the fuel cell system 30 includes a hydrogen gas supply unit 120 including a hydrogen tank 110 and an air supply unit 140 including a compressor 130. Moreover, the fuel cell system 30 further includes a cooling medium circulation unit, not shown, configured to circulate a cooling medium in the fuel cell 100. The cooling medium is used to keep temperature of the fuel cell 100 within a predetermined range. Each component which is included in the hydrogen gas supply unit 120, the air supply unit 140, and the cooling medium circulation unit and which is driven due to the power generation of the fuel cell 100 is also referred to as fuel cell auxiliary machinery.

The fuel cell 100 has a stack structure with a plurality of unit cells stacked. The fuel cell 100 in the present embodiment is a polymer electrolyte fuel cell; however, another kind of fuel cell may be used. Each of the plurality of unit cells included in the fuel cell 100 includes a flow path formed to send hydrogen as fuel gas on an anode side (hereinafter also referred to as an anode side flow path) and a flow path formed to send air as oxidizing gas on a cathode side (hereinafter also referred to as a cathode side flow path) with an electrolyte membrane disposed between these flow paths. A voltage sensor 102 configured to detect output voltage from the fuel cell 100 and a current sensor 103 configured to detect output current from the fuel cell 100 are disposed on the wiring 178 configured to connect the fuel cell 100 and the DC-DC converter 104.

The fuel cell 100 includes a temperature sensor 105 configured to measure temperature of the fuel cell 100. For example, the temperature sensor 105 may be a temperature sensor that is disposed in a flow path of the cooling medium and configured to detect temperature of the cooling medium discharged from the fuel cell 100 after circulating in the fuel cell 100. Alternatively, the temperature sensor 105 may be a sensor configured to directly detect internal temperature of the fuel cell 100.

The hydrogen tank 110 included in the hydrogen gas supply unit 120 is a device configured to store the fuel gas including the hydrogen. Specifically, for example, the hydrogen tank 110 may be a tank configured to store high-pressure hydrogen gas, or a tank incorporating a hydrogen absorbing alloy inside that is configured to absorb the hydrogen so as to store the hydrogen. The hydrogen gas supply unit 120 includes a hydrogen supply flow path 121 disposed from the hydrogen tank 110 to the fuel cell 100, a circulation flow path 122 configured to circulate unconsumed hydrogen gas (anode off gas) into the hydrogen supply flow path 121, and a hydrogen discharge flow path 123 configured to discharge the anode off gas into the air. In the hydrogen gas supply unit 120, the hydrogen gas stored in the hydrogen tank 110 goes through opening/closing of the flow path by an on-off valve 124 disposed in the hydrogen supply flow path 121 and decompression by a pressure reducing valve 125. Then, the hydrogen gas is supplied to the anode side flow path in the fuel cell 100 by an injector 126 disposed on a downstream side of the pressure reducing valve 125. Pressure of the hydrogen circulating in the circulation flow path 122 is adjusted by a circulation pump 127. Drive amounts of the injector 126 and the circulation pump 127 are adjusted by the controller 200 according to a target electric power that the fuel cell 100 should output.

Part of the hydrogen gas flowing in the circulation flow path 122 goes through an opening/closing adjustment by an on-off valve 129, disposed in the hydrogen discharge flow path 123 branching off from the circulation flow path 122, so as to be discharged into the air at predetermined timing. Accordingly, impurities other than the hydrogen, such as water vapor and nitrogen, in the hydrogen gas circulating in the circulation flow path 122 can be discharged from the flow path, so that a rise in impurity concentration in the hydrogen gas to be supplied to the fuel cell 100 can be suppressed. A gas-liquid separator, not shown, configured to remove moisture from the hydrogen gas circulating in the circulation flow path 122 is disposed at a portion where the hydrogen discharge flow path 123 branches off from the circulation flow path 122. Timing of the opening/closing of the on-off valve 124 is adjusted by the controller 200.

The air supply unit 140 is configured to supply the oxidizing gas including oxygen, that is, air in the present embodiment, to the fuel cell 100. The air supply unit 140 includes a first air flow path 141, a second air flow path 145, a third air flow path 146, a flow dividing valve 144, an air discharge flow path 142, and a pressure regulating valve 143, in addition to the compressor 130. The first air flow path 141 is a flow path through which entire air taken in by the compressor 130 flows. The second air flow path 145 and the third air flow path 146 branch off from the first air flow path 141. The flow dividing valve 144 is disposed at a portion where the first air flow path 141 branches off into the second air flow path 145 and the third air flow path 146. Adjusting an opening state of the flow dividing valve 144 can change a dividing ratio of the air flowing from the first air flow path 141 into the second air flow path 145 or the third air flow path 146. Part of the second air flow path 145 forms the cathode side flow path in the fuel cell 100. The third air flow path 146 is a bypass flow path configured to lead the air not via the fuel cell 100. The second air flow path 145 and the third air flow path 146 join to form the air discharge flow path 142. The pressure regulating valve 143 is a throttle valve disposed in the second air flow path 145 on a downstream side of the cathode side flow path and an upstream side of a joining portion between the second air flow path 145 and the third air flow path 146. Adjusting an opening degree of the pressure regulating valve 143 can change back pressure in the cathode side flow path in the fuel cell 100. The air discharge flow path 142 is a flow path configured to discharge the air (cathode off gas) that passes through the second air flow path 145 to the outside along with the air that passes through the third air flow path 146. The air discharge flow path 142 is connected with the hydrogen discharge flow path 123. The hydrogen discharged via the hydrogen discharge flow path 123 is diluted by the air flowing in the air discharge flow path 142 before discharged into the air. A drive amount of the compressor 130, the opening degree of the pressure regulating valve 143, and the opening state of the flow dividing valve 144 are adjusted by the controller 200.

The secondary battery 172 may be formed from a lithium ion battery or a nickel hydrogen battery, for example. The secondary battery 172 may be any kind of chargeable/dischargeable power storage device. Such a power storage device may be formed from the secondary battery, or, for example, a condenser. A remaining charge monitor 173 and a temperature sensor 175 are disposed on the secondary battery 172. The remaining charge monitor 173 is configured to detect an operation state of the secondary battery 172 such as remaining charge. The remaining charge of the secondary battery 172 is an indicator for how much the secondary battery 172 is charged. The remaining charge monitor 173 may integrate current values and time of charging and discharging of the secondary battery 172 so as to estimate the remaining charge, for example. Alternatively, the remaining charge may be derived from voltage of the secondary battery 172. The remaining charge monitor 173 outputs a signal indicating the remaining charge to the controller 200. The temperature sensor 175 is configured to detect temperature of the secondary battery 172 and output a detection signal to the controller 200. The temperature sensor 175 may directly detect the temperature of the secondary battery 172, or, for example, estimate the temperature of the secondary battery 172 based on outside air temperature and a calorific value due to charging/discharging of the secondary battery 172.

The DC-DC converter 104 has a function to change an output state of the fuel cell 100 upon receipt of a control signal from the controller 200. Specifically, the DC-DC converter 104 takes out current and voltage from the fuel cell 100 toward the loads. Switching control in the DC-DC converter 104 controls the current and the voltage to be taken out from the fuel cell 100. Moreover, the DC-DC converter 104 boosts the output voltage from the fuel cell 100 to the voltage applicable to the loads when supplying the electric power generated by the fuel cell 100 to the loads such as the drive motor 170.

The DC-DC converter 174 has a charging/discharging control function to control the charging and discharging of the secondary battery 172. The DC-DC converter 174 controls the charging and discharging of the secondary battery 172 upon receipt of a control signal from the controller 200. In addition, the DC-DC converter 174 sets target voltage on an output side under the control of the controller 200 so as to take out the electric power stored in the secondary battery 172 and apply voltage to the drive motor 170. As a result, a taking-out state of the electric power and a voltage level applied to the drive motor 170 are variably adjusted. The DC-DC converter 174 disconnects between the secondary battery 172 and the wiring 178 when there is no need to perform charging and discharging the secondary battery 172.

The controller 200 includes a so-called microcomputer equipped with a central processing unit (CPU) executing logical operation, a read-only memory (ROM), a random-access memory (RAM), and so forth. The controller 200 is configured to receive detected signals from the aforementioned sensors included in the hydrogen gas supply unit 120 and the air supply unit 140 and various sensors such as an accelerator opening degree sensor 180, a shift position sensor, a vehicle speed sensor, and an outer temperature sensor so as to perform various control relating to the fuel cell vehicle 20. For example, the controller 200 calculates a quantity of output required of the drive motor 170 based on a detected signal from the accelerator opening degree sensor 180 or the like, and transmits driving signals to respective components so that the electric power corresponding to the required output can be obtained from at least one of the fuel cell 100 and the secondary battery 172. Specifically, when obtaining the electric power from the fuel cell 100, the controller 200 controls a gas supply amount from the hydrogen gas supply unit 120 and the air supply unit 140 so that a desired amount of the electric power can be obtained from the fuel cell 100. Moreover, the controller 200 controls the DC-DC converter 104 and the DC-DC converter 174 so that the desired amount of the electric power can be supplied to the loads such as the drive motor 170 from at least one of the fuel cell 100 and the secondary battery 172. The controller 200 is also referred to as a power controller. FIG. 1 illustrates functional blocks representing part of functions performed by the controller 200. Specifically, the controller 200 includes at least a fuel cell controller 210 and a remaining charge controller 220 as the functional blocks. Operation of these functional blocks will be described later in detail.

In FIG. 1, the controller 200 controls the entire fuel cell vehicle 20; however, a different configuration may be adopted. For example, the controller 200 may include a plurality of controllers such as a controller in relation to operation of the fuel cell system 30, a controller in relation to traveling of the fuel cell vehicle 20, and a controller configured to control auxiliary machinery of the vehicle which is not involved in traveling, and the plurality of controllers may communicate with each other for necessary information.

Figure 2:
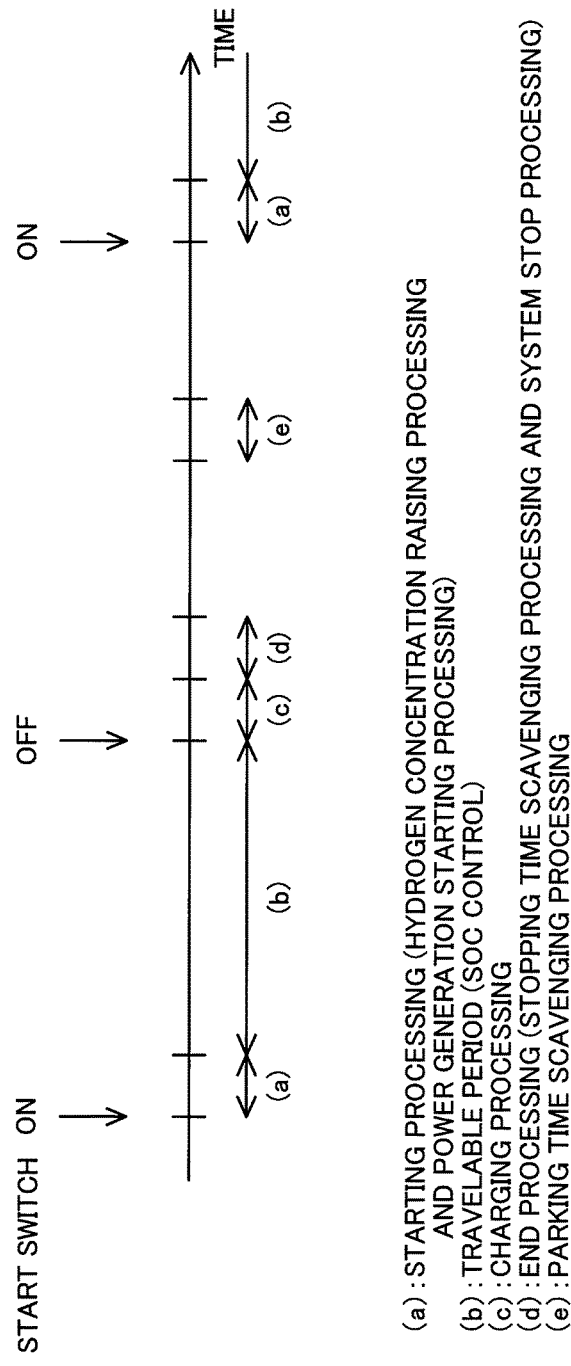
FIG. 2 is an explanatory diagram illustrating an outline of processing that may be performed in the fuel cell vehicle.

(A-2) Processing that May be Performed in Fuel Cell Vehicle:

FIG. 2 is an explanatory diagram illustrating an outline of processing that may be performed in the fuel cell vehicle 20. The fuel cell vehicle 20 includes a start switch, not shown, by which a user issues instructions for starting and stopping the fuel cell system 30. In FIG. 2, "ON" represents timing when a start instruction for starting the fuel cell system 30 is input by the start switch while "OFF" represents timing when a stop instruction for stopping the fuel cell system 30 is input. Details of each processing that may be performed in the fuel cell vehicle 20 is hereinafter described in order with reference to FIG. 2.

When the start instruction is input by the start switch, the controller 200 of the fuel cell system 30 performs "starting processing". In FIG. 2, (a) represents a period when the "starting processing" is performed. The "starting processing" is performed in a period from the input of the start instruction to a start of power generation by the fuel cell 100. As described later, hydrogen concentration in the anode side flow path gradually decreases while the fuel cell system 30 is stopped. Thus, the "starting processing" includes processing for raising the hydrogen concentration in the anode side flow path in the fuel cell 100 (hereinafter also referred to as "hydrogen concentration raising processing") and processing for starting the power generation by the fuel cell 100 (hereinafter also referred to as "power generation starting processing").

When the start instruction is input in the fuel cell system 30, the controller 200 performs the "hydrogen concentration raising processing" including opening the on-off valve 124, driving the circulation pump 127, and opening the injector 126 and the on-off valve 129 at predetermined timing. Accordingly, highly concentrated hydrogen gas is supplied from the hydrogen tank 110 to the anode side flow path, and at least part of gas in the anode side flow path is replaced with the highly concentrated hydrogen gas. As a result, the hydrogen concentration in the anode side flow path is raised. In addition, in the "hydrogen concentration raising processing", the controller 200 drives the compressor 130 and switches the flow dividing valve 144 to introduce the entire amount of the air flowing in the first air flow path 141 into the third air flow path 146. Accordingly, the hydrogen exhausted from the fuel cell system 30 via the hydrogen discharge flow path 123 is diluted by the air.

The aforementioned "hydrogen concentration raising processing" is for securely starting the fuel cell 100, particularly when starting at low temperature such as temperature below the freezing point. When the fuel cell 100 starts the power generation, liquid water may be retained in the anode side flow path. Alternatively, when the fuel cell 100 starts the power generation and the liquid water is produced due to the power generation, the liquid water may move to and stay in the anode side flow path. At the startup below the freezing point, such liquid water may freeze in the anode side flow path. When power generating reaction sufficiently proceeds in the fuel cell 100, even if freezing occurs, frozen water is immediately melted by heat generated due to the power generation. Therefore, it is possible to recover from a freezing state. However, if the power generating reaction is insufficient due to low hydrogen concentration or the like, and thus heat generation is insufficient, it is not possible to recover from the freezing state. As a result, a flow of the hydrogen in the anode side flow path is disturbed, which may cause a unit cell where the hydrogen is in short supply (hereinafter referred to as a hydrogen deficient cell). Occurrence of the hydrogen deficient cell may create problems in the startup of the entire fuel cell 100. In the present embodiment, performing the "hydrogen concentration raising processing" raises the hydrogen concentration in the anode side flow path. Therefore, hydrogen deficiency is suppressed even if freezing starts at the startup of the fuel cell system 30, thereby suppressing occurrence of the hydrogen deficient cell. The "hydrogen concentration raising processing" may be performed only when the start instruction is input under a temperature condition below the freezing point. With this configuration, the hydrogen consumed by the "hydrogen concentration raising processing" can be saved under a non-freezing temperature condition. Alternatively, in the fuel cell system 30, elapsed time from a stop of the fuel cell system 30 to input of a subsequent start instruction may be measured. Then, the "hydrogen concentration raising processing" may be performed when the elapsed time exceeds predetermined reference time. With this configuration, the hydrogen consumed for the "hydrogen concentration raising processing" can be saved when the hydrogen concentration in the anode side flow path is sufficiently high.

After completing the "hydrogen concentration raising processing", the controller 200 starts the power generation by the fuel cell 100 by the "power generation starting processing" and terminates the "starting processing". In the "power generation starting processing", the hydrogen is supplied to the anode side flow path continuously after the "hydrogen concentration raising processing". In addition, the controller 200 switches the flow dividing valve 144 so as to start supplying the air to the cathode side flow path. Furthermore, in the "power generation starting processing", the controller 200 connects the fuel cell 100 and the loads such as the drive motor 170 so as to enable power supply to the respective loads.

The aforementioned "starting processing" is performed before the fuel cell 100 starts the power generation, and thus consumes the electric power stored in the secondary battery 172. A drive amount and driving time of the fuel cell auxiliary machinery in the "hydrogen concentration raising processing" and the "power generation starting processing" are previously set. Accordingly, the electric power required for the "hydrogen concentration raising processing" and the "power generation starting processing" can be previously calculated. Thus, the electric power required to perform the "starting processing" can be previously calculated.

After the "starting processing" is completed and the fuel cell 100 starts the power generation in the fuel cell system 30, the fuel cell vehicle 20 is under a travelable condition. In FIG. 2, (b) represents a travelable period in which the fuel cell vehicle 20 can travel. In the travelable period, the fuel cell vehicle 20 travels using at least one of the fuel cell 100 and the secondary battery 172 as a driving power source, as described above. At this time, in the controller 200 of the fuel cell vehicle 20, driving states of the fuel cell system 30 and the drive motor 170 are controlled so that remaining charge of the secondary battery 172 can be equal to or higher than a predetermined lower limit. Such a control of the remaining charge of the secondary battery 172 in the travelable period is performed by the remaining charge controller 220 in the controller 200 (see FIG. 1). The control of the remaining charge of the secondary battery 172 in the travelable period will be described later in detail.

Then, when the stop instruction to stop the fuel cell system 30 is input by the start switch, the controller 200 of the fuel cell system 30 performs "charging processing" for charging the secondary battery 172 by using the fuel cell 100 if necessary. In FIG. 2, (c) represents a period when the "charging processing" is performed. The "charging processing" is for securing the electric power in the secondary battery 172. The electric power is required for various processing to be performed in the fuel cell system 30 in a period from the input of the stop instruction to a restart of the power generation by the fuel cell 100 in response to the subsequent start instruction input after the stop instruction. When the remaining charge of the secondary battery 172 is insufficient for the secondary battery 172 to cover the required electric power when the stop instruction is input, the controller 200 performs the "charging processing" to secure the required electric power before performing the various processing. The "charging processing" is also referred to as "remaining charge raising processing". Specific operation of the "charging processing" will be described later in detail.

After the "charging processing" is completed, the controller 200 of the fuel cell system 30 performs "end processing". In FIG. 2, (d) represents a period when the "end processing" is performed. The "end processing" includes "stopping time scavenging processing" and "system stop processing". The "stopping time scavenging processing" is for scavenging moisture from both the anode side flow path and the cathode side flow path by using respective reaction gases (fuel gas or oxidizing gas) when the power generation by the fuel cell 100 is stopped. The "system stop processing" is for stopping the fuel cell system 30. The aforementioned "charging processing" and "end processing" are performed by the fuel cell controller 210 configured to control an operation state of the fuel cell system 30 (see FIG. 1).

In the "stopping time scavenging processing", the controller 200 opens the on-off valve 124 and the injector 126, drives the circulation pump 127, and opens the on-off valve 129 at predetermined timing on the anode side flow path. In addition, on the cathode side flow path, the controller 200 maintains a switched state of the flow dividing valve 144 and drives the compressor 130 to supply the air to the cathode side flow path. Accordingly, the anode side flow path can be scavenged by the hydrogen serving as the fuel gas while the cathode side flow path can be scavenged by the air serving as the oxidizing gas. When the fuel cell 100 stops the power generation, temperature of the fuel cell 100 is relatively high (about 60° C., for example). Therefore, scavenging by using the reaction gases can remove the moisture in the flow paths for the fuel gas and the oxidizing gas. The longer scavenging time in the "stopping time scavenging processing" is, the higher a degree of moisture removal from the flow paths for the gases is. Removing the moisture from the flow paths for the reaction gases can suppress retention of liquid water in the flow paths for the reaction gases and freezing of the retained liquid water while the fuel cell system 30 is stopped. In order to suppress the retention and the freezing of the liquid water in the flow paths for the reaction gases after the power generation is stopped, the "stopping time scavenging processing" may be performed longer as the outside air temperature is lower. In the "stopping time scavenging processing", the hydrogen is supplied to the anode side flow path, and the air is supplied to the cathode side flow path, so that the fuel cell 100 generates the electric power. However, power consumption of the fuel cell auxiliary machinery or the like in the "stopping time scavenging processing" is larger than a power generation amount. Therefore, the "stopping time scavenging processing" consumes the electric power stored in the secondary battery 172.

In the "system stop processing" performed after the "stopping time scavenging processing", the controller 200 closes the on-off valve 124 in the hydrogen supply flow path 121, an on-off valve included in the injector 126, and the on-off valve 129 in the hydrogen discharge flow path 123. Accordingly, the flow paths from the injector 126 to the on-off valve 129 including the anode side flow path are sealed, so that the hydrogen gas is sealed therein. Such flow paths are hereinafter also referred to as the anode side flow path as a whole. Moreover, the controller 200 stops the compressor 130 and closes the pressure regulating valve 143. Accordingly, the flow paths from the compressor 130 to the pressure regulating valve 143 including the cathode side flow path are sealed, so that the air is sealed therein. Such flow paths are hereinafter also referred to as the cathode side flow path as a whole. When the flow paths are sealed as described above, the fuel cell 100 generates the electric power using the hydrogen sealed in the anode side flow path and the oxygen included in the air sealed in the cathode side flow path. The hydrogen sealed in the anode side flow path is excessive to the oxygen in the air sealed in the cathode side flow path. Therefore, when the oxygen in the cathode side flow path is consumed, the power generation by the fuel cell 100 stops. As a result, the gas sealed in the cathode side flow path is mostly nitrogen. When the controller detects a stop of the power generation by using a detected value from the voltage sensor 102, the controller 200 disconnects the fuel cell 100 from the secondary battery 172 and the loads such as the fuel cell auxiliary machinery to stop the fuel cell system 30. A power generation amount in the "system stop processing" is very small, and thus the "system stop processing" consumes the electric power stored in the secondary battery 172.

The drive amount and driving time of the fuel cell auxiliary machinery in the "stopping time scavenging processing" and the "system stop processing" are previously set. Accordingly, the electric power required for the "stopping time scavenging processing" and the "system stop processing" can be previously calculated. Thus, the electric power required to perform the "end processing" can be previously calculated.

When the power generation by the fuel cell 100 is stopped and then the fuel cell system 30 is stopped, the gases cross leak between the anode side flow path and the cathode side flow path via the electrolyte membrane in the fuel cell 100. Accordingly, gas compositions of the gas in the anode side flow path and the gas in the cathode side flow path become gradually similar, and the hydrogen concentration in the anode side flow path is gradually reduced.

In a period when the fuel cell system 30 is stopped, the controller 200 may perform the "parking time scavenging processing". In FIG. 2, (e) represents a period when the "parking time scavenging processing" is performed. The "parking time scavenging processing" is performed to suppress freezing of the liquid water in the anode side flow path in the period when the fuel cell system 30 is stopped. In the fuel cell system 30 in the present embodiment, not all the functions are stopped when the system is stopped, but part of the functions of the controller 200 or the like keeps operating to monitor the temperature of the fuel cell 100 so as to scavenge the anode side flow path, if necessary, as the "parking time scavenging processing".

Figure 3:
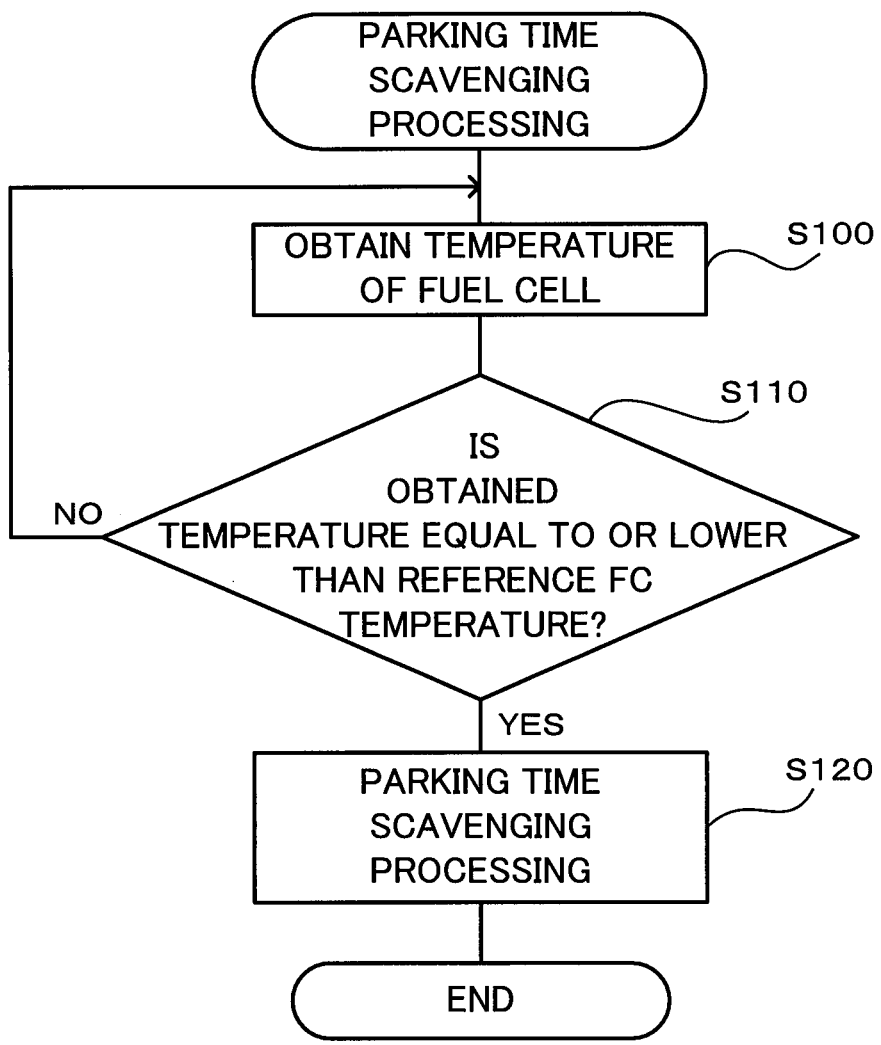
FIG. 3 is a flowchart illustrating a parking time scavenging processing routine.

FIG. 3 is a flowchart illustrating the parking time scavenging processing routine performed by the controller 200 according to the present embodiment. The routine is performed by the controller 200 after the fuel cell system 30 is stopped subsequently to the completion of the "end processing".

When the routine is activated, the controller 200 obtains the temperature of the fuel cell 100 from the temperature sensor 105 (step S100). Then, the controller 200 determines whether the obtained temperature of the fuel cell 100 is equal to or lower than a predetermined reference fuel cell temperature (hereinafter referred to as a reference FC temperature) (step S110). The reference FC temperature is predetermined as temperature indicating a low temperature state that is close to but higher than the freezing point. For example, the reference FC temperature may be set to 5 to 10° C. The controller 200 repeats performing the processing in the steps S100 and S110 until it determines that the temperature of the fuel cell 100 is equal to or lower than the reference FC temperature. When the controller 200 determines that the temperature of the fuel cell 100 is equal to or lower than the reference FC temperature in the step S110 (step S110: YES), the controller 200 performs the "parking time scavenging processing" (step S120) and terminates the routine.

In the "parking time scavenging processing", the controller 200 temporarily activate the fuel cell system 30 so as to scavenge the anode side flow path using the hydrogen in the hydrogen tank 110. Specifically, the controller 200 opens the on-off valve 124 and the injector 126, drives the circulation pump 127, and opens the on-off valve 129 at predetermined timing so as to scavenge the anode side flow path using the hydrogen in the hydrogen tank 110. At this time, the controller 200 drives the compressor 130 and switches the flow dividing valve 144 to introduce the entire amount of the air flowing in the first air flow path 141 into the third air flow path 146. Accordingly, the hydrogen exhausted from the fuel cell system 30 via the hydrogen discharge flow path 123 is diluted.

As the temperature of the fuel cell 100 is getting lower, water vapor included in the gas sealed in the flow path in the fuel cell 100 may be condensed into water. Performing the "parking time scavenging processing" removes the liquid water from the anode side flow path before the temperature drops to freezing temperature of the liquid water, even when the condensed liquid water is produced in the anode side flow path. Therefore, occurrence of freezing in the anode side flow path can be suppressed. The drive amount and driving time of the fuel cell auxiliary machinery in the "parking time scavenging processing" are previously set. Accordingly, the electric power required for the "parking time scavenging processing" can be previously calculated.

In the fuel cell system 30, when the start instruction is subsequently input by the start switch, the "starting processing" is performed again.

(A-3) Operation at System Stop:

Operation performed when the stop instruction is input by the start switch is hereinafter described in more detail.

Figure 4:
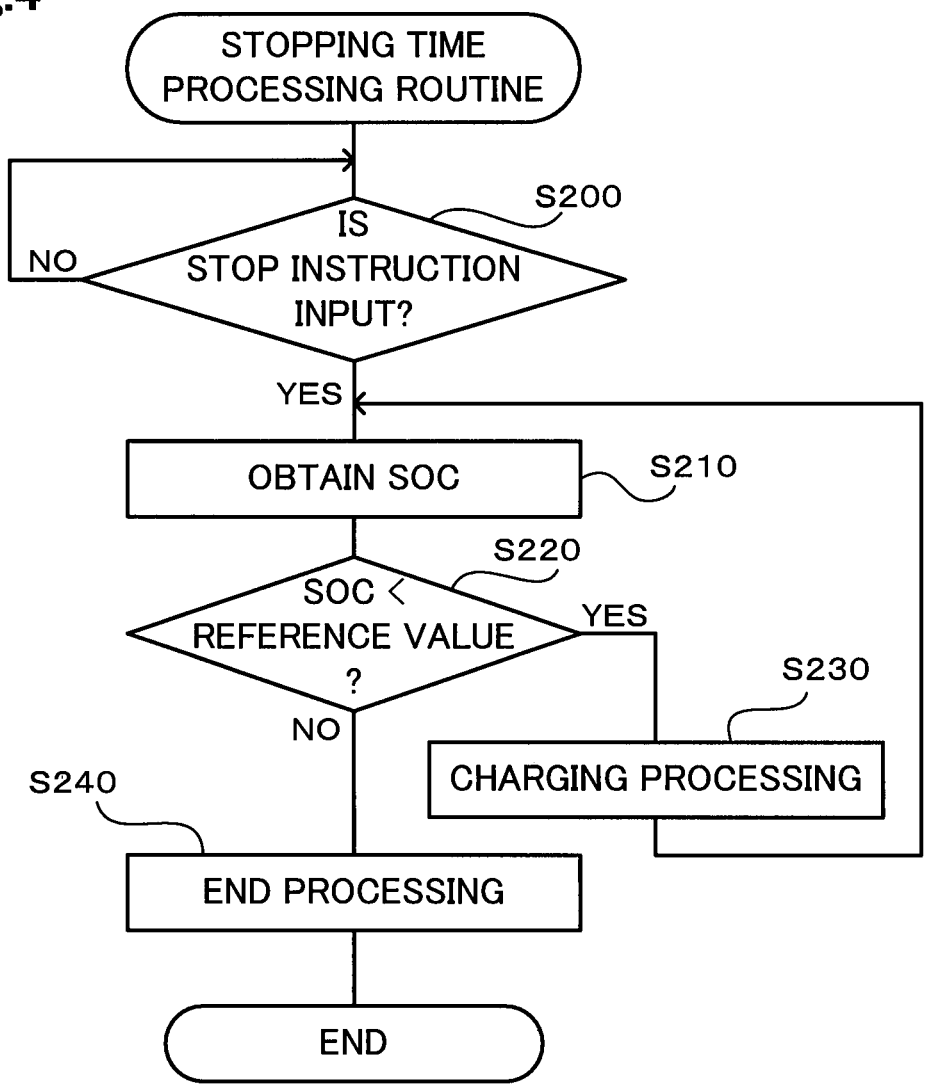
FIG. 4 is a flowchart illustrating a stopping time processing routine.

FIG. 4 is a flowchart illustrating a stopping time processing routine performed by the controller 200 according to the present embodiment. The routine is performed by the controller 200 when the fuel cell system 30 is in operation. When the routine is activated, the controller 200 determines whether the stop instruction is input by the start switch (step S200). The controller 200 repeats the determination in the step S200 until the stop instruction is input by the start switch.

When the controller 200 determines that the stop instruction is input in the step S200 (step S200: YES), the controller 200 obtains the remaining charge (state of charge: SOC) of the secondary battery 172 from the remaining charge monitor 173 (step S210). Then, the controller 200 compares the obtained SOC with a predetermined reference value (step S220).

The reference value used in the step S220 is defined as a value of the remaining charge which enables the secondary battery 172 to supply the electric power required for the processing to be performed in the fuel cell system 30 in the period from the input of the stop instruction to the restart of the power generation by the fuel cell 100 in response to the subsequent start instruction input after the stop instruction. Specifically, the electric power is required to perform the "end processing", the "parking time scavenging processing", and the "starting processing".

As described above, if conditions in performing the "end processing", the "parking time scavenging processing", and the "starting processing" are predetermined, the electric power required to perform these three processing can be found. As a result, the reference value to cover the required electric power can be predetermined. The "parking time scavenging processing" is not performed unless the fuel cell 100 reaches the predetermined low temperature state in the period when the fuel cell system 30 is stopped; however, presuming the temperature in the period when the system is stopped is usually difficult at the time when the system is stopped. Therefore, the aforementioned reference value is defined as a value assuming that the "parking time scavenging processing" is performed. Moreover, the "hydrogen concentration raising processing" in the "starting processing" may be performed only when the start instruction is input under the temperature condition below the freezing point; however, presuming the temperature when the system is started next time is usually difficult. Therefore, the aforementioned reference value is defined as a value assuming that the "hydrogen concentration raising processing" is performed in the "starting processing". That is, the aforementioned reference value is defined as a value of the electric power required in the period from the input of the stop instruction to the restart of the power generation by the fuel cell 100 in response to the subsequent start instruction input after the stop instruction, and a value equal to or higher than the remaining charge which enables the secondary battery 172 to supply the electric power required at least when the start instruction is input under the temperature condition below the freezing point.

In the step S220, when the controller 200 determines that the obtained SOC is lower than the reference value (step S220: YES), the controller 200 performs the "charging processing" (step S230). Then, the controller 200 repeats the processing in the steps S210 to S230 until the controller 200 determines that the SOC is equal to or higher than the reference value in the step S220 so as to charge the secondary battery 172 using the fuel cell 100.

When the controller 200 determines that the obtained SOC is equal to or higher than the reference value in the step S220 (step S220: NO), the controller 200 performs the "end processing" (step S240) and terminates the routine.

(A-4) Control of Remaining Charge in Vehicle Traveling:

In the fuel cell vehicle 20 in the present embodiment, the controller 200 controls the remaining charge (state of charge: SOC) of the secondary battery 172 to be equal to or higher than the predetermined lower limit in the travelable period ((b) in FIG. 2), as described above. For example, when a load requirement in the fuel cell vehicle 20 is large and both the fuel cell 100 and the secondary battery 172 are used as drive power sources, the SOC of the secondary battery 172 gradually decreases. In such a case, when the SOC of the secondary battery 172 drops to the predetermined lower limit, the controller 200 controls output of the fuel cell vehicle 20 to stop using the secondary battery 172 and charges the secondary battery 172 using the fuel cell 100 so as to recover the SOC. Alternatively, when only the secondary battery 172 is used as the power source at a time of a small load requirement or the like and the SOC of the secondary battery 172 drops to the lower limit, the controller 200 starts the power generation by the fuel cell 100 to supply the electric power to the loads from the fuel cell 100 and to charge the secondary battery 172 using the fuel cell 100. Accordingly, the SOC of the secondary battery 172 is maintained to be equal to or higher than the lower limit in the travelable period.

Excessive decrease of the SOC usually causes undesirable deterioration of the secondary battery 172. Therefore, a minimum value of the SOC ($SOC_{min}$) is defined to protect the secondary battery 172. Setting the lower limit equal to or higher than the minimum value ($SO_{Cmin}$) can suppress the undesirable deterioration of the secondary battery 172. In the present embodiment, the lower limit is set in a range higher than the minimum value ($SOC_{min}$) according to the temperature of the secondary battery 172.

Figure 5:
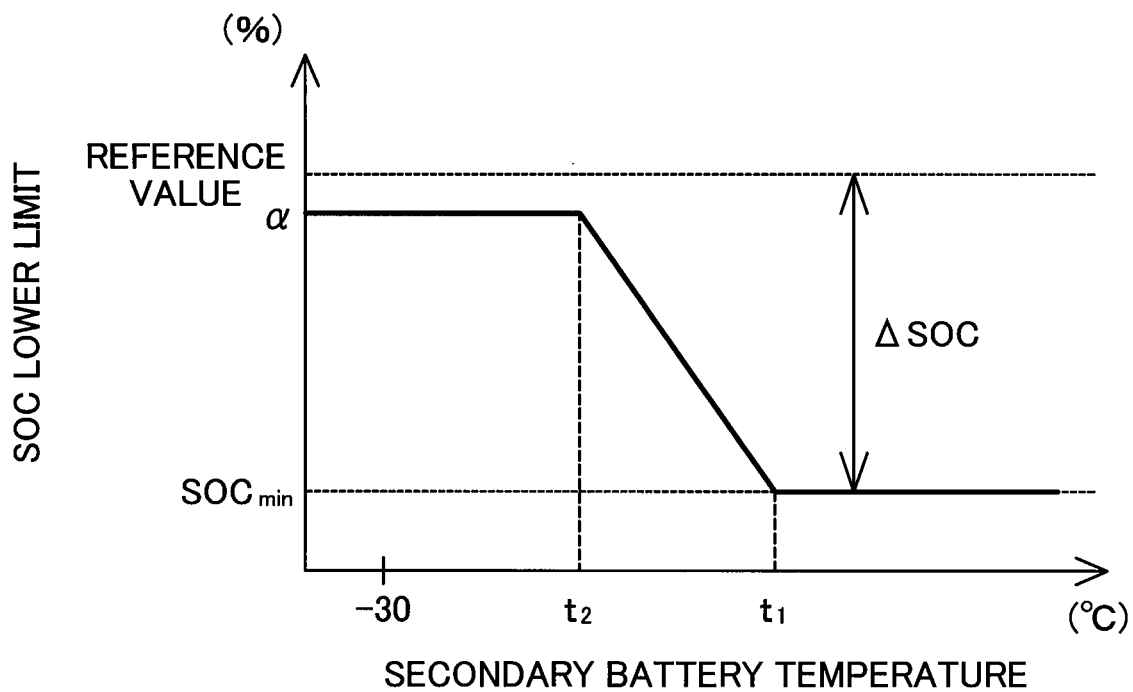
FIG. 5 is a graph illustrating a relation between temperature and a lower limit of remaining charge of a secondary battery.

FIG. 5 is a graph illustrating a relation between the temperature of the secondary battery 172 and the lower limit of the SOC set in relation to the secondary battery 172 in the travelable period in the fuel cell vehicle 20 according to the present embodiment. In FIG. 5, a horizontal axis represents the temperature of the secondary battery 172 while a vertical axis represents the lower limit of the SOC of the secondary battery 172. As shown in FIG. 5, when the temperature of the secondary battery 172 is equal to or higher than a temperature t1, the lower limit of the SOC is set to the minimum value ($SOC_{min}$). The temperature t1 is also referred to as a first temperature. Moreover, when the temperature of the secondary battery 172 is equal to or lower than a temperature t2, the lower limit of the SOC is set to a value a that is higher than the minimum value ($SOC_{min}$). The temperature t2 is also referred to as a second temperature. Furthermore, when the temperature of the secondary battery 172 is between the first temperature t1 and the second temperature t2, the lower limit of the SOC is set to become lower, from the value a to the minimum value ($SOC_{min}$), as the temperature of the secondary battery 172 becomes higher. As aforementioned, when the temperature of the secondary battery 172 is at the second temperature t2, which is lower than the first temperature t1, the remaining charge is controlled by setting the lower limit to a value higher than the lower limit set at the first temperature t1 in the present embodiment. The controller 200 in the present embodiment includes a memory and stores the relation shown in FIG. 5 as a map in the memory. Accordingly, the controller 200 controls the operation state of the fuel cell system 30 referring to the map so that the SOC of the secondary battery 172 is equal to or higher than the lower limit shown in FIG. 5 according to the temperature of the secondary battery 172 in the travelable period.

FIG. 5 also shows the reference value used for necessity determination of the "charging processing". In addition, in FIG. 5, a difference between the reference value and the minimum value ($SOC_{min}$) is represented by $\Delta SOC$. As aforementioned, the SOC of the secondary battery 172 is controlled to be equal to or higher than the lower limit shown in FIG. 5 according to the temperature of the secondary battery 172 in the travelable period. Then, in the "charging processing" performed in response to the input of the stop instruction, the secondary battery 172 is charged until the SOC of the secondary battery 172 becomes equal to or higher than the reference value. Accordingly, the lower the temperature of the secondary battery 172 is in the travelable period, the lower a maximum value of a charging amount of the secondary battery 172 is in the subsequent "charging processing".

Figure 6:
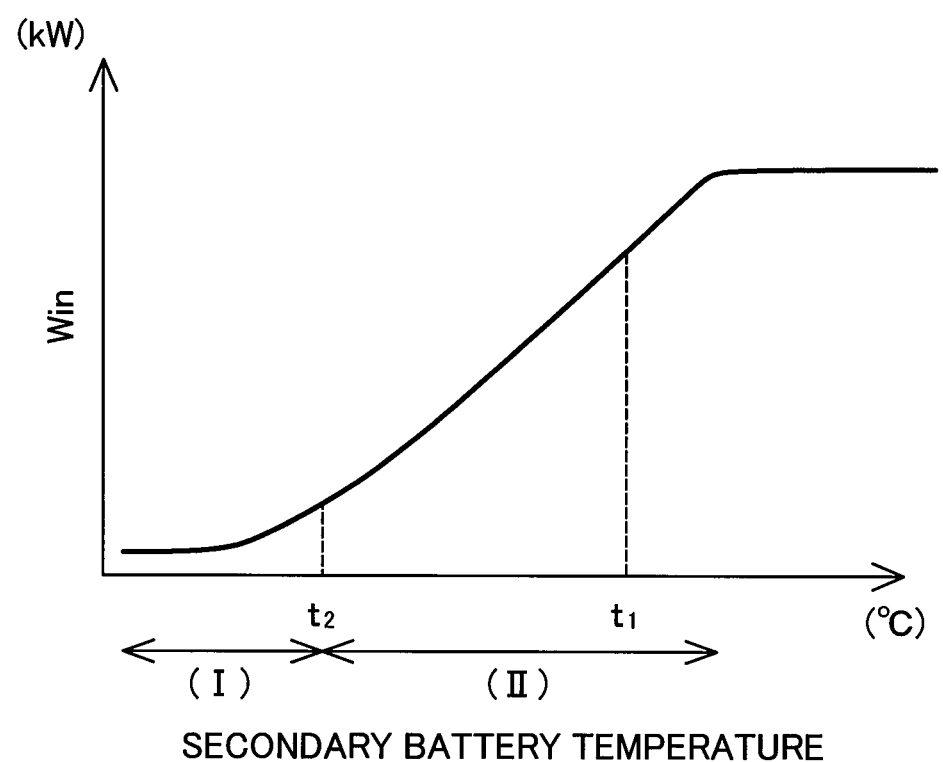
FIG. 6 is a graph illustrating a relation between the temperature and allowable charging power Win of the secondary battery.

FIG. 6 is a graph illustrating a relation between the temperature and allowable charging power Win of the secondary battery 172. The allowable charging power Win is an upper limit of charging power of the secondary battery 172 and is a value indicating charging performance of the secondary battery 172. Higher allowable charging power Win indicates higher charging performance, which enables faster charging. As shown in FIG. 6, the allowable charging power Win is strongly affected by the temperature of the secondary battery 172. The graph shown in FIG. 6 is an example, and an effect of the temperature of the secondary battery 172 on the allowable charging power Win is especially remarkable when the secondary battery 172 is a lithium ion battery. However, other kinds of secondary batteries also show a similar tendency.

In the present embodiment, the second temperature t2 is set as the temperature on a boundary between a temperature range where a degree of increase of the allowable charging power Win according to a rise in the temperature of the secondary battery 172 is relatively small and the allowable charging power Win is relatively low (range (I) in FIG. 6) and a temperature range where the degree of increase of the allowable charging power Win according to the rise in the temperature of the secondary battery 172 is large (range (II) in FIG. 6). In addition, the first temperature t1 is set as temperature which is in the temperature range (II) where the degree of increase of the allowable charging power Win according to the rise in the temperature of the secondary battery 172 is large, and which is slightly lower than temperature at which the allowable charging power Win reaches the maximum. Then, as shown in FIG. 5, when the temperature of the secondary battery 172 is equal to or lower than the temperature t2, the lower limit of the SOC is set to the value a that is higher than the minimum value ($SOC_{min}$). When the temperature of the secondary battery 172 is equal to or higher than the temperature t1, the lower limit of the SOC is set to the minimum value ($SOC_{min}$). When the temperature of the secondary battery 172 is between the temperature t1 and the temperature t2, the lower limit of the SOC is set to become lower as the temperature of the secondary battery 172 becomes higher. Accordingly, when the temperature of the secondary battery 172 is relatively low and the charging performance of the secondary battery 172 is low, the charging amount of the secondary battery 172 using the fuel cell 100 after the input of the stop instruction can be reduced.

According to the fuel cell vehicle 20 in the present embodiment configured as described above, the electric power required for the processing to be performed before the restart of the power generation by the fuel cell 100 in the fuel cell system 30 can be prepared in the secondary battery 172 when the system is stopped. In addition, when the temperature of the secondary battery 172 is relatively low in the period from the input of the start instruction to the input of the stop instruction, more regenerative electric power can be stored in the secondary battery 172 so as to reduce the charging amount for charging the secondary battery 172 using the fuel cell 100 after the input of the stop instruction. Therefore, the supply efficiency of the electric power for charging the secondary battery 172 can be enhanced, and thus the fuel efficiency (traveling distance per unit amount of hydrogen) of the entire fuel cell vehicle 20 can be improved.

In the fuel cell vehicle 20 in the present embodiment, in order to smoothly perform a low temperature startup, the secondary battery 172 is charged to enable the secondary battery 172 to supply the electric power required for the processing to be performed in the fuel cell system 30 in the period from the input of the stop instruction to the restart of the power generation by the fuel cell in response to the subsequent start instruction input at the temperature below the freezing point. Then, when the temperature of the secondary battery 172 is at the second temperature (temperature t2, for example), which is lower than the first temperature (temperature t1, for example) in the travelable period, the remaining charge is controlled by setting the lower limit to a value higher than the lower limit set at the first temperature t1. Therefore, a maximum charging amount can be reduced if the "charging processing" is performed after the stop instruction when the allowable charging power Win is lower due to lower temperature of the secondary battery 172 and thus the "charging processing" takes a relatively long time. When the secondary battery 172 is charged in traveling of the fuel cell vehicle 20, the fuel efficiency can be improved by using the regenerative electric power. On the other hand, when the secondary battery 172 is charged in the "charging processing", the secondary battery 172 is charged by the fuel cell 100, which deteriorate the fuel efficiency. As aforementioned, when the temperature of the secondary battery 172 is lower and the allowable charging power Win is lower, reducing the charging amount in the "charging processing" can suppress the deterioration of the fuel efficiency caused by charging the secondary battery 172 using the fuel cell 100. When the temperature of the secondary battery 172 is higher and the allowable charging power Win is higher, the secondary battery 172 can be charged faster. Therefore, the deterioration of the fuel efficiency caused by charging the secondary battery 172 by using the fuel cell 100 can be reduced.

According to the present embodiment, as described above, a power generation amount by the fuel cell 100 after the input of the stop instruction can be reduced when the temperature of the secondary battery 172 is lower (for example, lower than the temperature t2). Therefore, it is possible to reduce an amount of water discharged through the air discharge flow path 142 in the fuel cell 100 due to the power generation by the fuel cell 100 after the input of the stop instruction. As a result, it is possible to restrain a user from feeling a sense of incongruity due to the discharged water produced by the power generation in spite of his/her stop instruction.

B. Second Embodiment

The fuel cell vehicle 20 according to the second embodiment has a configuration similar to that of the fuel cell vehicle 20 according to the first embodiment, and, as shown in FIG. 2, performs the starting processing, SOC control in the travelable period, the charging processing, the end processing, and the parking time scavenging processing, as in the first embodiment. The fuel cell vehicle 20 in the second embodiment is different from that in the first embodiment in an aspect for setting the lower limit of the SOC when the SOC control is performed in the travelable period.

Figure 7:
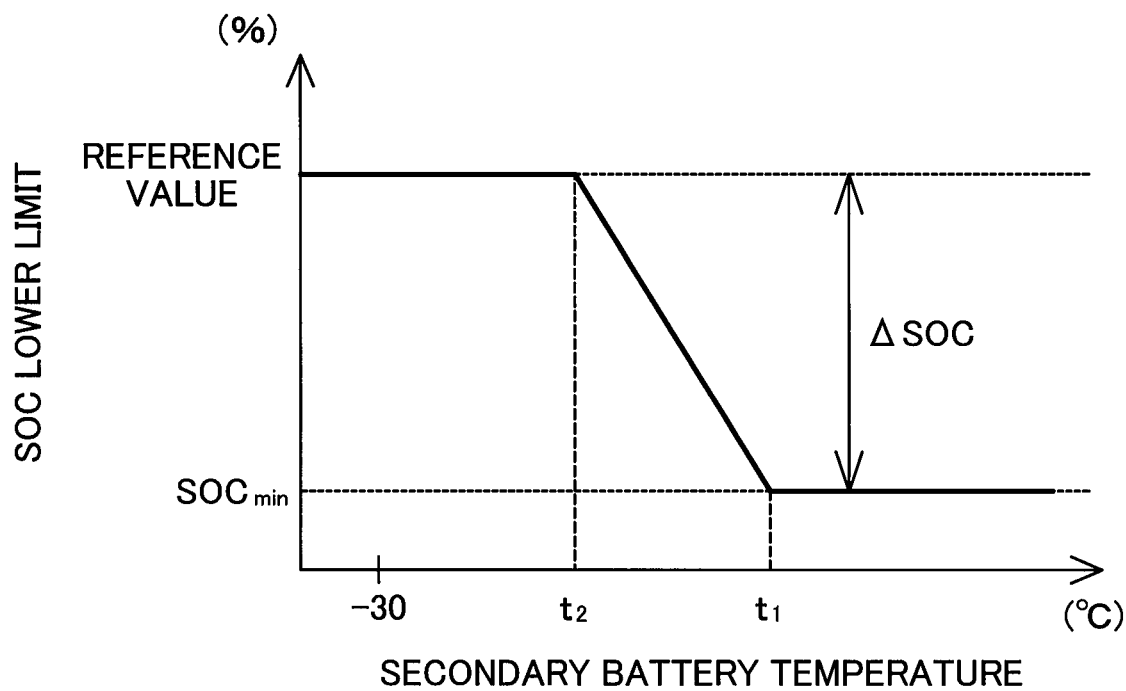
FIG. 7 is a graph illustrating a relation between the temperature and the lower limit of the remaining charge of the secondary battery.

FIG. 7 is a graph illustrating a relation between the temperature of the secondary battery 172 and the lower limit of the SOC set to perform the SOC control of the secondary battery 172 in the travelable period in the fuel cell vehicle 20 according to the second embodiment, in the same manner as that in FIG. 5. As shown in FIG. 7, in the second embodiment, when the temperature of the secondary battery 172 is lower than the second temperature t2, the lower limit of the SOC is set to the aforementioned reference value used for the necessity determination of the charging processing when the system is stopped. Therefore, when the temperature of the secondary battery 172 is lower than the second temperature t2, more regenerative electric power can be stored in the secondary battery 172. Accordingly, it is unnecessary to perform the "charging processing" when the fuel cell system 30 is stopped, and to use the fuel cell 100 to charge the secondary battery 172 under the low temperature condition which requires a relatively long time to charge the secondary battery 172. Therefore, the effect for improving the fuel efficiency of the entire fuel cell vehicle 20 can be more enhanced. In the second embodiment, the lower limit of the SOC is set to the aforementioned reference value as shown in FIG. 7; however, a different configuration may be adopted. Similar advantageous effects can be provided as long as the lower limit of the SOC is equal to or higher than the aforementioned reference value.

In the second embodiment, when the temperature of the secondary battery 172 is lower than the second temperature t2, the lower limit of the SOC is set to a value higher than that in the first embodiment when the SOC control is performed in the travelable period. Accordingly, the charging amount of the secondary battery 172 using the regenerative electric power generated by the drive motor 170 is further reduced when the vehicle is traveling. Reducing use of the regenerative electric power may cause the deterioration of the fuel efficiency of the entire fuel cell vehicle 20. However, under the low temperature condition where the temperature of the secondary battery 172 is lower than the second temperature t2, charging speed for charging the secondary battery 172 is reduced due to the low allowable charging power Win of the secondary battery 172. Accordingly, even if the secondary battery 172 is charged with the regenerative electric power, utilization efficiency of the regenerative electric power is suppressed. Therefore, an effect of reducing the use of the regenerative electric power by setting the lower limit of the SOC higher in the travelable period is considered to be small.

C. Alternative Embodiments (C1) In the aforementioned embodiments, the "parking time scavenging processing" is performed when the temperature of the fuel cell 100 is equal to or lower than the reference FC temperature in a period when the fuel cell system 30 is stopped; however, a different configuration may be adopted. For example, when the "stopping time scavenging processing" in the "end processing" is performed longer to more thoroughly remove the moisture in the flow paths of the reaction gases in the fuel cell 100 when the system is stopped, the "parking time scavenging processing" may be omitted even if the temperature of the fuel cell 100 drops in the period when the fuel cell system 30 is stopped. In such a case, the reference value to be secured in the "charging processing" at the time of the system stop may be set excluding the electric power required for the "parking time scavenging processing".

(C2) In the aforementioned embodiments, the lower limit of the SOC of the secondary battery 172 is controlled as shown in FIG. 5 or FIG. 7 according to the temperature of the secondary battery 172 throughout the travelable period; however, a different configuration may be adopted. The effect for enhancing the supply efficiency of the electric power used to charge the secondary battery 172 is obtained by using the regenerative electric power for charging the secondary battery 172. Therefore, the control of the lower limit of the SOC based on the temperature of the secondary battery 172 may be performed at least in a period when the secondary battery 172 can be charged with the regenerative electric power.

(C3) In the aforementioned embodiments, when the SOC of the secondary battery 172 is lower than the reference value when the stop instruction is input, the secondary battery 172 is charged, and when the SOC is equal to or higher than the reference value, the "end processing" is performed without charging the secondary battery 172; however, a different configuration may be adopted. For example, the secondary battery 172 may be charged a little when the stop instruction is input, even if the SOC of the secondary battery 172 is equal to or higher than the reference value. Advantageous effects similar to those of the aforementioned embodiments can be obtained by performing the "charging processing" at least when the SOC of the secondary battery 172 is lower than the reference value when the stop instruction is input.

(C4) In the aforementioned embodiments, the reference value of the SOC of the secondary battery 172, which is used for the necessity determination of the charging processing when the system is stopped, is set as a value that enables the secondary battery 172 to cover all the electric power required for the processing to be performed in the period from the system stop to the subsequent low-temperature restart; however, a different configuration may be adopted. For example, when the fuel cell vehicle 20 is equipped with another power supply device such as a solar power generator, the electric power required in the period from the system stop to the low temperature restart can be secured even if the reference value of the SOC is set lower.

The present disclosure is not limited to the embodiments described above, and may be implemented in various ways without departing from the spirit and scope of the present disclosure. For example, the technical features of any of the above embodiments may be replaced or combined appropriately, in order to solve part or all of the problems described above or in order to achieve part or all of the advantageous effects described above. Any of the technical features may be omitted appropriately unless the technical feature is described as essential in the description hereof. For example, the present disclosure may be implemented as the following aspects.

(1) According to one aspect of the present disclosure, a fuel cell vehicle is provided. The fuel cell vehicle comprises a fuel cell system including a fuel cell and fuel cell auxiliary machinery, a drive motor configured to drive the fuel cell vehicle, a power storage device configured to be charged with electric power generated by the fuel cell and regenerative electric power generated by the drive motor and to store electric power to supply to the drive motor, a remaining charge monitor configured to detect remaining charge in the power storage device, a temperature sensor configured to detect temperature of the power storage device, and a power controller configured to control an operation state of the fuel cell system while controlling the remaining charge of the power storage device to be equal to or higher than a predetermined lower limit. When the temperature of the power storage device detected by the temperature sensor is a second temperature, which is lower than a predetermined first temperature, at least in a period when the power storage device is allowed to be charged with the regenerative electric power, the power controller controls the remaining charge by setting the lower limit to a value higher than the lower limit set at the first temperature. When a stop instruction for the fuel cell system is input, the power controller performs a remaining charge raising processing for raising the remaining charge of the power storage device.

According to the fuel cell vehicle in this aspect, more regenerative electric power can be stored in the power storage device. When the stop instruction is input, the remaining charge of the power storage device can be increased and a charging amount of the power storage device using the fuel cell can be reduced. Therefore, supply efficiency of electric power used to charge the power storage device can be enhanced, and thus fuel efficiency of the fuel cell vehicle can be improved.

(2) In the fuel cell vehicle in the aforementioned aspect, when the temperature of the power storage device detected by the temperature sensor is the second temperature, in a period from input of a start instruction for the fuel cell system to input of a stop instruction for the fuel cell system subsequent to the start instruction, the power controller may control the remaining charge by setting the lower limit to the value higher than the lower limit set at the first temperature. According to the fuel cell vehicle in this aspect, more remaining charge can be secured when the temperature of the power storage device is the second temperature, in the period from the input of the start instruction to the input of the stop instruction for the fuel cell system, no matter whether the regenerative electric power is available.

(3) In the fuel cell vehicle in the aforementioned aspect, when the remaining charge detected by the remaining charge monitor is lower than a predetermined reference value when the stop instruction for the fuel cell system is input, the power controller may cause the fuel cell to charge the power storage device. When the remaining charge is equal to or higher than the reference value when the stop instruction is input, the power controller may drive the fuel cell auxiliary machinery to perform end processing to be performed when the fuel cell system is stopped, without charging the power storage device. According to the fuel cell vehicle in this aspect, when the remaining charge of the power storage device is equal to or higher than the reference value when the stop instruction is input, charging the power storage device by using the fuel cell is not performed. Therefore, deterioration of the fuel efficiency due to charging the power storage device by using the fuel cell can be suppressed.

(4) In the fuel cell vehicle in the aforementioned aspect, the reference value may be a value equal to or higher than the remaining charge that enables the power storage device to supply electric power required by the fuel cell system for processing to be performed in the fuel cell system in a period from the input of the stop instruction to a restart of power generation by the fuel cell in response to a subsequent start instruction for starting the fuel cell system being input below the freezing point. According to the fuel cell vehicle in this aspect, it is possible to secure the electric power required for starting the fuel cell system when the system is stopped, even if a subsequent startup of the fuel cell system is performed below the freezing point.

(5) In the fuel cell vehicle in the aforementioned aspect, the lower limit may be equal to or higher than the reference value. According to the fuel cell vehicle in this aspect, the remaining charge of the power storage device can be secured using more regenerative electric power generated by the drive motor. Therefore, it is possible to reduce a charging amount of the power storage device when the fuel cell system is stopped, and enhance an effect for improving the fuel efficiency of the fuel cell vehicle.

The present disclosure may be implemented in various aspects such as a control method of the fuel cell vehicle, a computer program for implementing the control method, and a non-transitory storage medium storing the computer program.

What is claimed is:

1. A fuel cell vehicle comprising:
   a fuel cell system including a fuel cell and fuel cell auxiliary machinery;
   a drive motor configured to drive the fuel cell vehicle;
   a power storage device configured to be charged with electric power generated by the fuel cell and regenerative electric power generated by the drive motor, and to store electric power to supply to the drive motor;
   a remaining charge monitor configured to detect remaining charge of the power storage device;
   a temperature sensor configured to detect temperature of the power storage device; and
   a power controller configured to control an operation state of the fuel cell system while controlling the remaining charge of the power storage device to be equal to or higher than a predetermined lower limit,
   wherein when the temperature of the power storage device detected by the temperature sensor is a second temperature, which is lower than a predetermined first temperature, at least in a period when the power storage device is allowed to be charged with the regenerative electric power, the power controller controls the remaining charge by setting the lower limit to a value higher than the lower limit set at the first temperature, and
   wherein when a stop instruction for the fuel cell system is input, the power controller performs a remaining charge raising processing for raising the remaining charge of the power storage device.

2. The fuel cell vehicle according to claim 1, wherein when the temperature of the power storage device detected by the temperature sensor is the second temperature, in a period from input of a start instruction for the fuel cell system to input of a stop instruction for the fuel cell system subsequent to the start instruction, the power controller controls the remaining charge by setting the lower limit to the value higher than the lower limit set at the first temperature.

3. The fuel cell vehicle according to claim 1, wherein
   when the remaining charge detected by the remaining charge monitor is lower than a predetermined reference value when the stop instruction for the fuel cell system is input, the power controller causes the fuel cell to charge the power storage device, and
   when the remaining charge is equal to or higher than the reference value when the stop instruction is input, the power controller drives the fuel cell auxiliary machinery to perform end processing to be performed when the fuel cell system is stopped, without charging the power storage device.

4. The fuel cell vehicle according to claim 3, wherein the reference value is a value equal to or higher than the remaining charge that enables the power storage device to supply electric power required by the fuel cell system for processing to be performed in the fuel cell system in a period from the input of the stop instruction to a restart of power generation by the fuel cell in response to a subsequent start instruction for starting the fuel cell system being input below a freezing point.

5. The fuel cell vehicle according to claim 3, wherein the lower limit is equal to or higher than the reference value.

6. A method for controlling a fuel cell vehicle, the fuel cell vehicle comprising:
   a fuel cell system including a fuel cell and fuel cell auxiliary machinery;
   a drive motor configured to drive the fuel cell vehicle;
   a power storage device configured to be charged with electric power generated by the fuel cell and regenerative electric power generated by the drive motor, and to store electric power to supply to the drive motor;
   a remaining charge monitor configured to detect remaining charge of the power storage device; and
   a temperature sensor configured to detect temperature of the power storage device,
   the method comprising:
   when the temperature of the power storage device detected by the temperature sensor is a second temperature, which is lower than a predetermined first temperature, when the remaining charge of the power storage device is controlled to be equal to or higher than a predetermined lower limit at least in a period when the power storage device is allowed to be charged with the regenerative electric power, controlling the remaining charge by setting the lower limit to a value higher than the lower limit set at the first temperature; and when a stop instruction for the fuel cell system is input, performing remaining charge raising processing for raising the remaining charge of the power storage device.

* * * * *